Patented Apr. 26, 1949

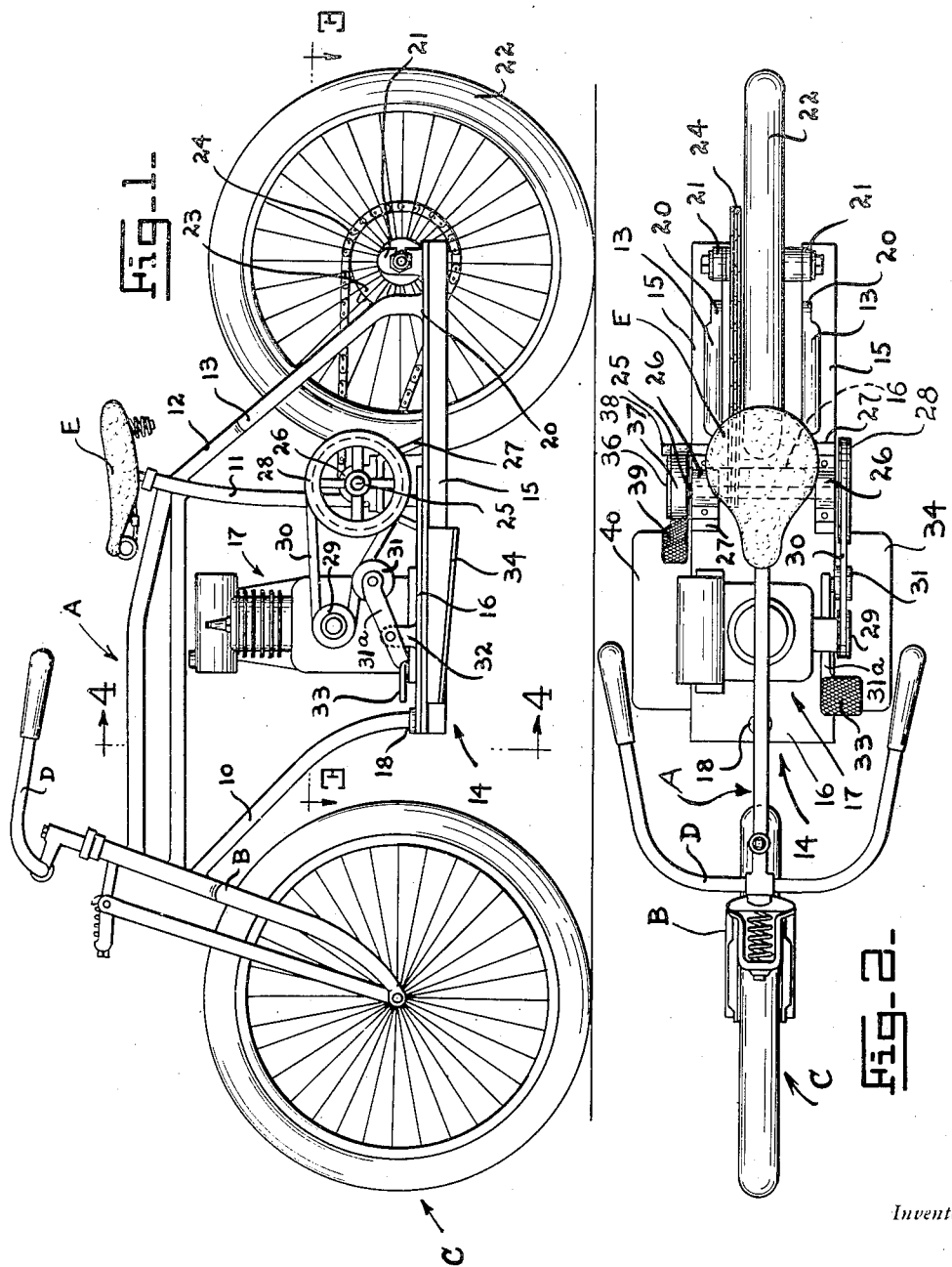

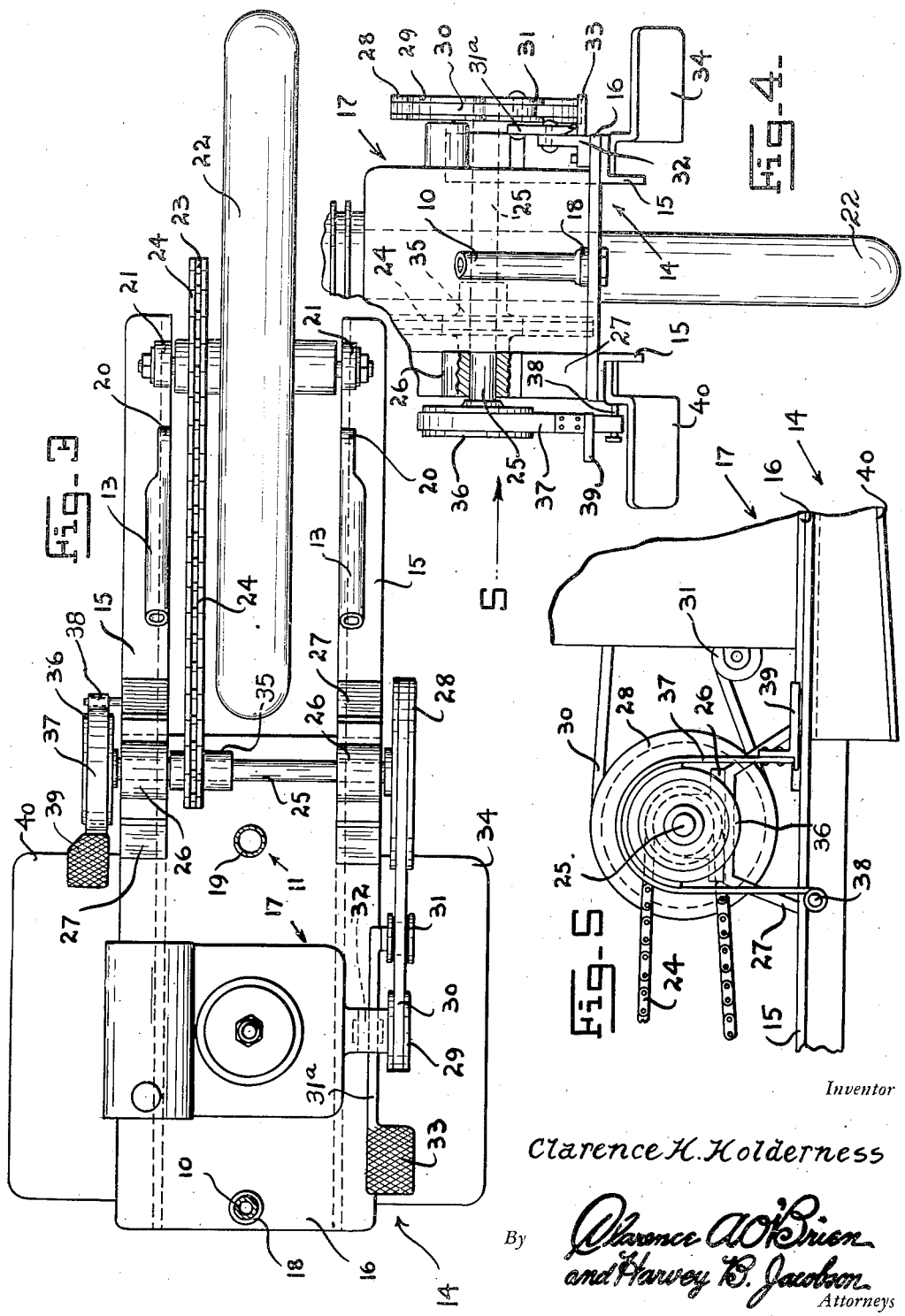

2,468,367

UNITED STATES PATENT OFFICE 2,468,367

MOTOR BASE FOR ATTACHMENT TO BICYCLE FRAMES

Clarence H. Holderness, Galion, Ohio

Application May 29, 1945, Serial No. 596,545

4 Claims. (Cl. 180—33)

1

This invention relates, broadly and generally speaking, to so-called motorized bicycles, but has reference more specifically to a structural assemblage, for instance, adapter and supporting means for a motor and power transmission means which may be conveniently and aptly referred to as a motor base for attachment to a bicycle frame.

Although the nature of the invention is such that a description thereof might well be approached as though it were a motorized "bike" or bicycle and means of transmitting motion to the rear drive wheel, it seems best to assume that the invention resides in a special type of a platform serving as a foundation for the motor and power transmission means, and also serving to permit the parts of a more or less conventional bicycle frame to be associated therewith. Hence, we have a novel platform and the association of parts mounted thereon, this so constructed as to permit a conventional bicycle of a sturdy type to be converted by resorting to certain modifications whereby to incorporate the platform and its parts in said bicycle.

An object of the invention is the provision of a simple platform characterized by angle irons or the like arranged in parallelism and serving as a support for a plate, the plate in turn serving as a support for the motor, said angle irons being adequate, in conjunction with the motor plate, to permit the lower end portions of conventional bicycle frame parts to be welded thereto to achieve the desired conversion and "make-over" results.

Another phase of the invention has to do with the adoption and use of the novel foundation or platform unit with associated parts mounted thereon in which the power from the prime mover or motor is transmitted by pulleys and a belt to a central cross-shaft from which it is taken to drive a sprocket and chain arrangement for propelling the rear wheel mounted on the rear end of the platform.

Another and companion phase which stems from this is the adoption and use of a belt tightener which is foot pedal-controlled, the pedal and belt tightener being used as a sort of a clutch to thus regulate the transmission of power and speed between the motor, the transverse drive shaft and the sprocket and chain means.

Another object and distinguishing phase of the invention pertains to the aforementioned central drive shaft on the platform having a belt pulley at one end and having a brake drum at the opposite end, the brake drum being so arranged as to permit the brake band to be associated therewith, the brake band having a foot pedal conveniently arranged in relation to one of the parts of the platform to expedite optional use thereof as necessary and desired.

Other features and advantages will become more readily apparent from the following description and the accompanying illustrative drawings.

In the drawings, wherein like numerals are employed to designate like parts throughout the same:

Figure 1 is a side elevational view of a more or less conventional bicycle having incorporated therein the invention, whereby to provide the conversion-type motorized bicycle.

Figure 2 is a top plan view of the assemblage shown in Figure 1.

Figure 3 is a horizontal section, on an enlarged scale, this on the plane of the line 3—3 of Figure 1, looking downwardly in the direction of the arrows.

Figure 4 is a vertical section taken approximately on the plane of the line 4—4 of Figure 1.

Figure 5 is a fragmentary side elevational view observing the side of the structure opposite to that seen in Figure 1, that is, a view observing Figure 4 in the direction of the arrow 5 from the left.

It is advisable, perhaps, to refer at the outset of the detailed description to Figure 1, for here we see the principal parts of what may be called a conventional bicycle. The frame thereof, generally speaking, is indicated at A, the front fork is at B and the front wheel C. The handle bars are at D and the seat at E. These parts are all conventional and are not altered. However, the frame parts denoted by the numerals 10, 11, 12 and 13 are cut and altered to achieve the desired conversion job.

The slight alterations attending the handling of the parts 10, 11, 12 and 13 are such as to accommodate the same for attachment to and welding on the adapter unit 14. This is the aforementioned platform and parts associated directly therewith. As stated, it comprises a pair of spaced parallel elongated angle irons 15 forming the nucleus of the frame. At one end said angle irons are interconnected by a flat rectangular plate 16. This plate is primarily a connecting web between the angle irons and also constitutes a base for a suitable prime mover or internal combustion engine of a single-cylinder type, as denoted at 17. It will be seen that the lower cut end of the frame bar 10 is welded or otherwise secured, as at 18, to the front end of said base plate. Secondly, as brought out to advantage in Figure 3, the lower cut end of the somewhat perpendicular bicycle frame member or bar 11 is welded or secured centrally to the rear end of said plate, as indicated at 19. The fork members 13 of the trailing bar 12 are similarly welded or otherwise fastened, as at 20, to the rear end portions of the angle irons 15. Outwardly and beyond these points of attachment I provide upstanding lugs 21 having notches in their rear edges to accommodate the ends of the axle supporting the rear bicycle drive wheel 22. This wheel is provided with a sprocket 23 and a chain 24 which is trained thereover.

At this time I direct attention to the centrally arranged transverse power take-off and drive shaft 25. This shaft corresponds in length with the width of the platform frame and has its opposite ends journaled in bearings 26 secured on the crown portions of the supporting yokes or stands 27. One leg of each stand is in turn secured in parallelism to opposite intermediate portions of the angle irons 15 and the other leg to plate 16. Thus, the bearings and the shaft are properly elevated and positioned. On one end of the shaft is a large transmission pulley 28 lined up with a smaller pulley 29 on the motor shaft. A belt 30 is trained over these pulleys. Also, associated with the lower flight of the belt is a pulley tightener 31 which serves as a clutch. This is mounted on an arm 31a which is in turn pivotally mounted on a supporting bracket 32 (see Fig. 1), said arm 31a having a pedal 33 located to be controlled by the toe of the left foot of the operator. The pedal is arranged in convenient reach in relation to a foot stirrup or bracket 34 which is arranged on one side of the frontal portion of the frame structure. When the belt is loose, it will slip and no motion will be transmitted from the source of power to the transmission shaft 25. However, the degree of pressure exerted on the pedal 33 will permit the belt tightener to serve as a clutch to regulate the speed of motion transmitted between the motor and rear wheel 22, this by way of the sprocket and chain. There is a small sprocket wheel 35 keyed on the shaft 25 in alignment with the first-named sprocket. The shaft 25 is also provided at the adjacent end with a brake drum 36, there being a brake band 37 trained thereover. The brake band is anchored at one end at 38, and the opposite end is connected with a foot pedal 39 which is located at the rear end of the foot stirrup 40 to be operated by the heel of the rider.

It is obvious that the power is transmitted from the platform-supported prime mover 17 to the cross-shaft 25 by way of the small and large pulleys and belt. The speed is controlled by the clutch, this being the belt tightener with its foot pedal 33. The power is taken off by the sprocket chain and transmitted to the rear wheel which does the driving. The rider occupies the seat and straddles the frame in the usual way and places his feet upon the rearwardly and downwardly inclined rests or stirrups 34 and 40. This permits the clutch to be toe-controlled with one foot and the brake to be heel-controlled with the other foot.

It is believed that the simple platform idea has made it possible to take a somewhat standard bicycle frame and to cut the parts 10, 11 and 13 and then weld them onto the platform using the latter part as an auxiliary component of the overall frame. Then, the platform serves as an adequate support for the drive wheel, that is, the rear wheel 22, and as a foundation and special adapter for the prime mover, the cross-shaft and pulley arrangement. In fact, all of the parts have been carefully chosen and coordinated into a simple assemblage which, as far as I know, is a novel contribution to this line of endeavor.

A careful consideration of the foregoing description in conjunction with the invention as illustrated in the drawings, will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

I claim:

1. A motor base for attachment to the wheel supported frame of a bicycle and comprising a frame structure embodying a longitudinally elongated platform adapted for horizontal disposition, and including a pair of opposed, spaced parallel, rectilinearly straight angle irons, a flat plate secured to and bridging the frontal end portions of said angle irons and constituting a supporting base for a prime mover, a pair of opposed bearings fixedly mounted on the intermediate portion of said platform, a transversely disposed power take-off and motion-transmitting shaft mounted for rotation in said bearings, a sprocket wheel secured for operation on the intermediate portion of said shaft, a pulley secured for operation on one end of said shaft, a brake drum secured for operation on the opposite end of said shaft, a brake band having one end anchored on said platform and having its intermediate portion frictionally contacting and coacting with the periphery of said brake drum, and an actuating foot pedal secured to and carried by the opposite end of said brake band for controlling and operating said band.

2. A motor base for attachment to the wheel supported frame of a bicycle and comprising a frame structure embodying a longitudinally elongated platform adapted for horizontal disposition, and including a pair of opposed, spaced parallel, rectilinearly straight angle irons, a flat plate secured to and bridging the frontal end portions of said angle irons and constituting a supporting base for a prime mover, a pair of opposed bearings fixedly mounted on the intermediate portion of said platform, a transversely disposed power take-off and motion-transmitting shaft mounted for rotation in said bearings, a sprocket wheel secured for operation on the intermediate portion of said shaft, a pulley secured for operation on one end of said shaft, a brake drum secured for operation on the opposite end of said shaft, a brake band having one end anchored on said platform and having its intermediate portion frictionally contacting and coacting with the periphery of said brake drum, an actuating foot pedal secured to and carried by the opposite end of said brake band for controlling and operating said band, a pair of rearwardly and downwardly inclined horizontally disposed flanges rigidly mounted on said angle irons and located on opposite sides of said plate and projecting outwardly beyond the plate and constituting foot-rests, said brake pedal being located above and adjacent to one end of one of said foot-rests.

3. A motor base for attachment to the wheel supported frame of a bicycle and comprising a frame structure embodying a longitudinally elongated platform adapted for horizontal disposition and including a pair of opposed, spaced parallel, rectilinearly straight angle irons, a flat plate secured to and bridging the frontal end portions of said angle irons and constituting a supporting base for a prime mover, a pair of opposed bearings fixedly mounted on the intermediate portion of said platform, a transversely disposed power take-off and motion-transmitting shaft mounted for rotation in said bearings, a sprocket wheel secured for operation on the intermediate portion of said shaft, a pulley secured for operation on one end of said shaft, a brake drum secured for operation on the opposite end of said shaft, a brake band having one end anchored on said platform and having its intermediate portion frictionally contacting and coacting with the periphery of said brake drum, an actuating foot pedal secured to and carried by the opposite end of said brake band for controlling and operating said band, a prime mover mounted for operation on said base plate and including a drive shaft and a pulley mounted on said drive shaft, said pulley having a V-shaped marginal groove, said first-named pulley also having a V-shaped marginal groove, a V-belt trained over said pulleys, a bracket mounted on one edge portion of said plate, an arm pivotally mounted on said bracket, a foot pedal carried by one end of the arm, and a belt tightening pulley carried by the opposite end of the arm and cooperating with an adjacent run of the belt.

4. A motor base of the class described comprising a frame structure embodying a longitudinally elongated platform adapted for horizontal disposition, and including a pair of opposed, spaced parallel, rectilinearly straight angle irons, a flat plate secured to and bridging the frontal end portions of said angle irons and constituting a supporting base for a prime mover, a pair of opposed bearings fixedly mounted on the intermediate portion of said platform, a transversely disposed power take-off and motion-transmitting shaft mounted for rotation in said bearings, a sprocket wheel secured for operation on the intermediate portion of said shaft, a pulley secured for operation on one end of said shaft, a brake drum secured for operation on the opposite end of said shaft, a brake band having one end anchored on said platform and having its intermediate portion frictionally contacting and coacting with the periphery of said brake drum, an actuating foot pedal secured to and carried by the opposite end of said brake band for controlling and operating said band, a prime mover mounted for operation on said base plate and including a drive shaft and a pulley mounted on said drive shaft, said pulley having a V-shaped marginal groove, said first-named pulley also having a V-shaped marginal groove, a V-belt trained over said pulleys, a bracket mounted on one edge portion of said plate, an arm pivotally mounted on said bracket, a foot pedal carried by one end of the arm, and a belt tightening pulley carried by the opposite end of the arm and cooperating with an adjacent run of the belt, a footrest being located beneath and in vertical alignment with said arm, the foot pedal on said arm being within the marginal confines of said foot rest.

CLARENCE H. HOLDERNESS.

REFERENCES CITED

The following references are of record in the file of this patent:

UNITED STATES PATENTS

| Number | Name | Date |
| --- | --- | --- |
| 582,984 | Davis | May 18, 1897 |
| 594,018 | Jacobs | Nov. 23, 1897 |
| 787,609 | Barker | Apr. 18, 1905 |
| 1,343,788 | Onar | June 15, 1920 |
| 2,071,761 | Nicholson | Feb. 23, 1937 |
| 2,239,122 | Stokes | Apr. 22, 1941 |
| 2,243,124 | Rockola | May 27, 1941 |
| 2,260,798 | Burns | Oct. 28, 1941 |
| 2,263,081 | Fulton | Nov. 18, 1941 |
| 2,275,050 | Lewis | Mar. 3, 1942 |
| 2,339,182 | McDonald | Jan. 11, 1944 |
| 2,379,901 | Hare | July 10, 1945 |